Figure 1A:
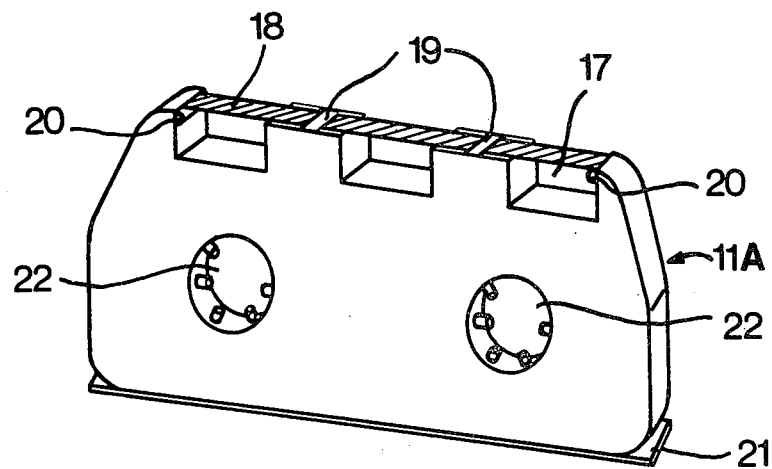

United States Patent [19]
Reimer et al.

[11] 4,453,683
[45] Jun. 12, 1984

[54] MAGNETIC TAPE CASSETTE ARRANGEMENTS

[75] Inventors: Karl-Juergen Reimer, Frankenthal; Dietmar Pfefferkorn, Hemsbach; Eberhard Koester, Frankenthal; Norbert Kreimes, Ludwigshafen; Wilhelmus Andriessen, Wachenheim; Herbert Wagner, Ludwigshafen; Werner Wagner, Oberkirch, all of Fed. Rep. of Germany

[73] Assignee: BASF Aktiengesellschaft, Ludwigshafen, Fed. Rep. of Germany

[21] Appl. No.: 212,630

[22] Filed: Dec. 3, 1980

[30] Foreign Application Priority Data
Dec. 22, 1979 [DE] Fed. Rep. of Germany ....... 2951951

[51] Int. Cl.³ .................. G03B 1/04; G11B 15/32
[52] U.S. Cl. .................................. 242/199; 206/389
[58] Field of Search .............................. 242/197–200, 242/192; 360/93, 96, 132; 206/387, 389

[56] References Cited
U.S. PATENT DOCUMENTS

| 2,867,389 | 1/1959 | Viets | 242/199 |
| 3,001,440 | 9/1961 | Foster | 242/199 |
| 3,796,394 | 3/1974 | Souza | 242/199 |
| 3,800,322 | 3/1974 | Schoettle et al. | 360/96 |
| 4,093,151 | 6/1978 | Karsh | 242/198 |
| 4,235,395 | 11/1980 | Wardenaar et al. | 242/199 |

*Primary Examiner*—Leonard D. Chistian
*Attorney, Agent, or Firm*—Keil & Witherspoon

[57] ABSTRACT

A cassette system for any type of recording medium in strip or tape form, such as films and magnetic tapes, consists essentially of a housing whose external dimensions match those of a conventional type of cassette, and a protective holder for the recording medium which is wound into at least one roll. The housing and the holder are separate or separable members and can be fitted together. Both are provided with means for inserting the holder into the housing in the correct position, and for introducing the recording medium into the transport apparatus. The housing is provided with opening and closing means. The holder can be designed to be separable from the roll of recording medium. Preferably, the housing is a precision-made article and the holder a low-cost article.

19 Claims, 12 Drawing Figures

FIG. 3A
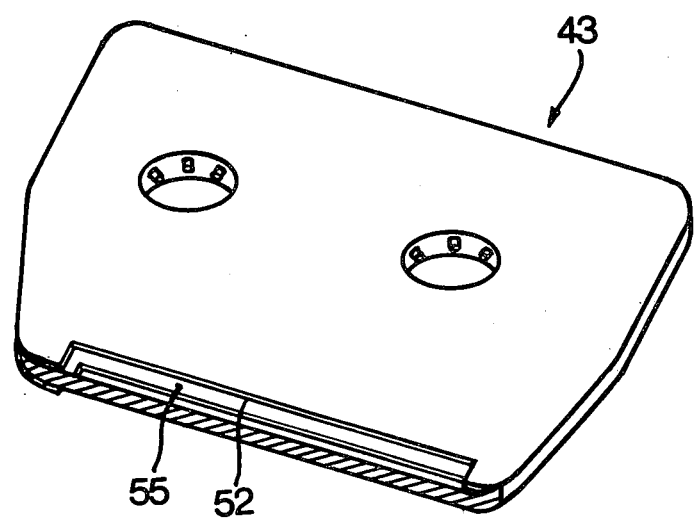
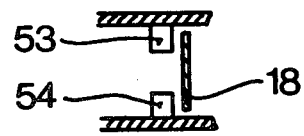
FIG. 3a

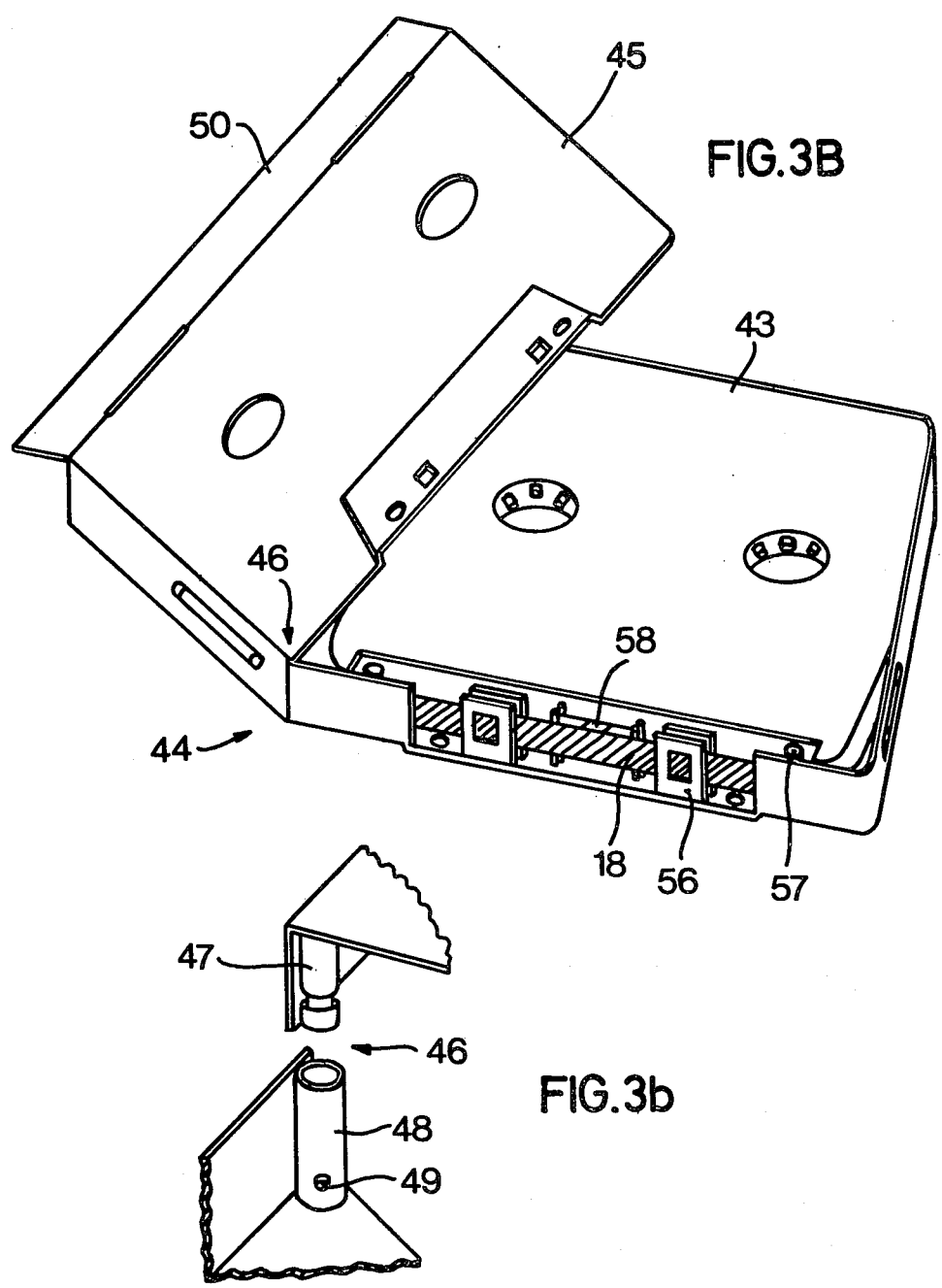

MAGNETIC TAPE CASSETTE ARRANGEMENTS

FIELD OF THE INVENTION

The present invention relates to a cassette for a recording medium in strip or tape form, particularly a magnetic tape, consisting of an approximately right parallelepipedal housing with openings serving to admit the drive members and scanning means on the transport apparatus, the scanning means cooperating with the recording medium which is located inside the housing, is wound into at least one roll, is guided in the housing by guide means and is driven by means of the drive members, and to a cassette housing and protective holder for a recording medium wound into at least one roll.

PRIOR ART

It is known to use cassettes for recording media in tape form, such as films and magnetic tapes for signal storage, in appropriate recording and/or playback apparatus. The signals which are to be stored or have been stored may be analog or digital signals which contain audio, video, data or instrumentation information, or a combination of these.

A large variety of such tape cassettes is known and in use in the audio, video, data processing and instrumentation fields. Some examples of such cassettes are briefly described below.

Compact cassettes have found world-wide acceptance in the audio sector, but special forms for data recording and video recording have also been disclosed; however, the latter are expensive to manufacture and in most cases cannot be mass-produced.

Compact cassettes, which are an inexpensive type of cassette, have housings with relatively large manufacturing tolerances and are therefore lacking particularly in respect of their tape guidance characteristics, so that regardless of the quality of the magnetic tape in the cartridge, the recording/playback quality attainable is poor.

It is also known from U.S. Pat. No. Re. 29,049 to accommodate virtually all of the tape guide means on the apparatus rather than inside the cassette, so that the cassette becomes a mere contained for the rolls of tape, the tape guide means on the apparatus passing through suitable openings in the container to engage the tape and the tape reels, so that very precise tape guidance is achieved substantially independently of the cassette housing. This type of cassette is equally suitable for recording data, video and audio signals and can also be employed with advantage in automatic cassette-playing equipment. In cassettes of this type which are currently on the market, the housing consists of a plastic, for example polystyrene, but contains metal components such as brake members and tape guide rolls and is therefore not very economical to manufacture.

OBJECT OF THE INVENTION

It is an object of the present invention to provide, on the basis of the prior art cassettes, a high-quality cassette for a recording medium, in particular a magnetic tape, which offers very precise guidance of the recording medium and enables the medium to be exchanged.

FEATURES AND ADVANTAGES OF THE INVENTION

We have found that this object is achieved by a cassette for a recording medium in strip or tape form, particularly a magnetic tape, consisting of an approximately right parallelepipedal housing with openings serving to admit the drive members and scanning means on the transport apparatus, the scanning means cooperating with the recording medium which is located inside the housing, is wound on at least one hub to form a roll (the hub and the roll of medium in combination being referred to hereinafter as "reel"), is guided in the housing by guide means and is driven by means of the drive members, wherein the reel and the housing are separate units, which can be brought together for operation, the reel being located, at least when outside the housing, in a protective holder which enables the reel and the recording medium to be introduced into the housing in the correct position, and wherein the housing is provided with opening and closing means and with means for inserting the reel and the recording medium into it in the correct position.

In this way, complete interchangeability of the recording medium (hereinafter referred to as "tape") is achieved, since the housing and the protective holder can be marketed separately. Not only does this offer the choice of different tape lengths and of different tape properties (photographic or magnetic), but it also permits optimum combination of products from different manufacturers, for example in order to achieve special audio or video effects or to meet special requirements in data signal storage or instrumentation signal storage.

The invention offers both the amateur and the professional user, in the case of all types of signals, an improvement in recording/playback quality, and a higher recording density, which in turn facilitates digital signal coding and offers greater storage capacity. The protective holder is in particular easy for amateurs to handle and is advantageously of a form suitable for filing in a library; it is made of a suitable material, and has an appropriate shape for protecting the tape adequately from external damage.

The housing is advantageously made of a more rigid material than the holder, is also easy to handle, especially for the amateur, and offers substantially constant highly accurate tape guidance when used in a transport apparatus conjointly with the tape, which is either within the protective holder or has been taken out of the latter.

The housing may include parts which are used on present-day commercial transport apparatus; such parts may originate directly from the apparatus production. Advantageously, the housing should be able to be mass-produced economically.

When a film is used as the recording medium, either the type of film or the sensitivity of the film material or a special contrast or color effect may be the criterion dictating an exchange of film.

In the case of magnetic tape, the type of tape (whether audio tape or video tape, etc.), the maximum output level or sensitivity of the magnetic material, the mechanical properties, or special measuring and testing characteristics, may constitute the criterion dictating a tape exchange.

Detailed features of the subject of the invention are discussed below. The reel or reels is/are at least part of the time accommodated in a protective holder, which is preferably flat and closed substantially on all sides.

Such a holder can be produced economically from plastic and/or paper, advantageously, in the case of plastics, by thermoforming, injection molding or compression molding or, in the case of paper, by other suitable mass production methods, for example pressing. The shape of the holder should be such as to allow simple and, preferably, automatic fitting of the tape into the holder.

A housing for such a holder, or for the recording medium taken from such a holder, may consist of a bottom and a lid which are lockably connected or connectable. This permits simple insertion and removal of the protective holder or of the recording medium taken therefrom, and ensures completely satisfactory operation of the cassette when the housing has been locked.

Advantageously, the bottom and lid are pivotally connected or connectable, the pivotal axis being horizontal or vertical.

Tape guide means may be provided on the bottom and on the lid, or, more particularly, on one of these.

In a very advantageous embodiment, the tape guide means are provided virtually exclusively on the housing. This makes it possible to achieve tape guidance of such high precision that even higher recording densities with smaller head gap lengths/track widths are readily attainable.

The tape guide means may be, for example, guide rolls or pins which, advantageously, are located near the openings for admitting the scanning means.

Furthermore, in a practical embodiment it is advantageous to provide the bottom or lid with means for accommodating and/or guiding the protective holder, thereby facilitating insertion of the holder into the housing in a predetermined position and/or closure of the housing.

In another practical embodiment, there are provided locking means for the lid and bottom, which ensure that the parts which affect the functioning of the cassette are in the correct position.

In a further embodiment, the protective holder is provided with a projection which can be gripped manually from outside the housing; in particular, the protective holder can be of a greater width than the housing.

In another embodiment, the protective holder is provided with guide slots for the reel(s) and/or for guide means present on the housing.

The protective holder is advantageously provided with means which enable it to be at least partially detached from the reel(s).

The housing can also be provided with an opening which may or may not be closable, for removing and introducing the protective holder.

Advantageous embodiments of the protective holder and of the housing according to the present invention and incorporating the above features are described below.

The protective holder for at least one reel comprises at lease one recess of a shape and size corresponding to those of a reel of the maximum intended diameter. A protective holder for two reels can also have a recess of a size and shape corresponding to those of two reels of half the maximum intended diameter. The protective holder is advantageously produced from a suitable plastic, such as rigid polyvinyl chloride, and consists of one or more thermoformed or injection-molded parts.

The housing consists, as is conventional, of an approximately right parallepipedal hollow body having a bottom and lid, one or both of which may have sidewalls, which enclose one or more reels. Drive means, provided on the apparatus, drive the reel(s) within the hollow body, so as to transport the tape, and scanning members, provided on the apparatus, are in contact, or can be brought into contact, with the transported tape, so as to effect recording and reproduction of information on and from the tape respectively. According to the invention, the bottom and lid are movably connected or connectable to one another by connecting means, and can be locked together. Furthermore, the connecting means can be removable or non-removable and in particular consist of hinge means.

The housing advantageously consists of a light metal, a light metal alloy or polystyrene.

ILLUSTRATIVE EMBODIMENTS OF THE INVENTION

Figure 1B:
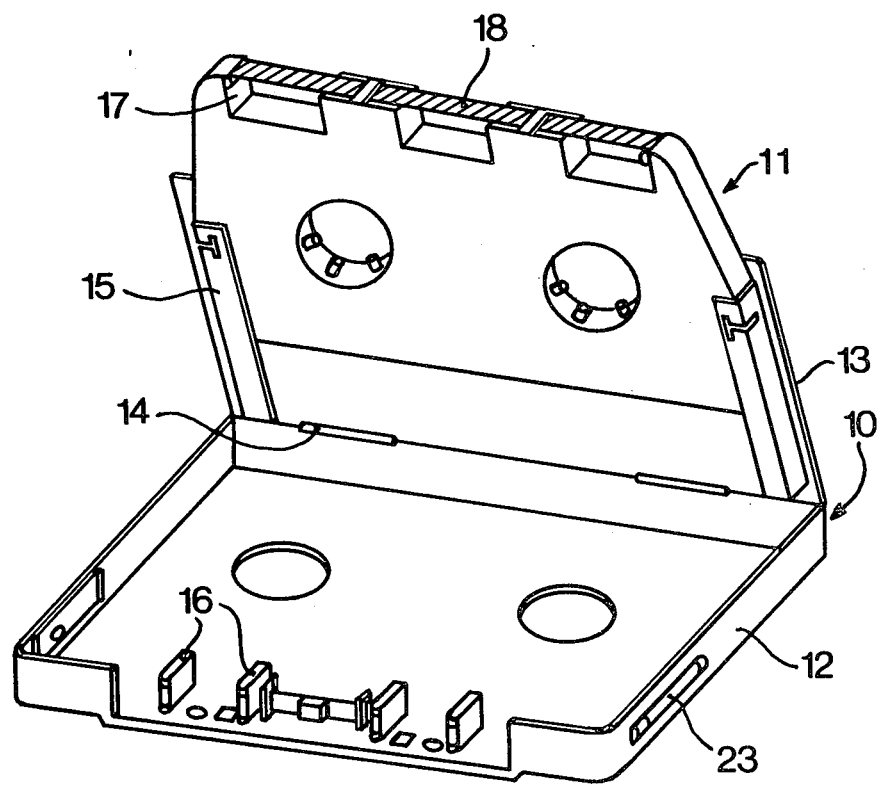
Figure 1C:
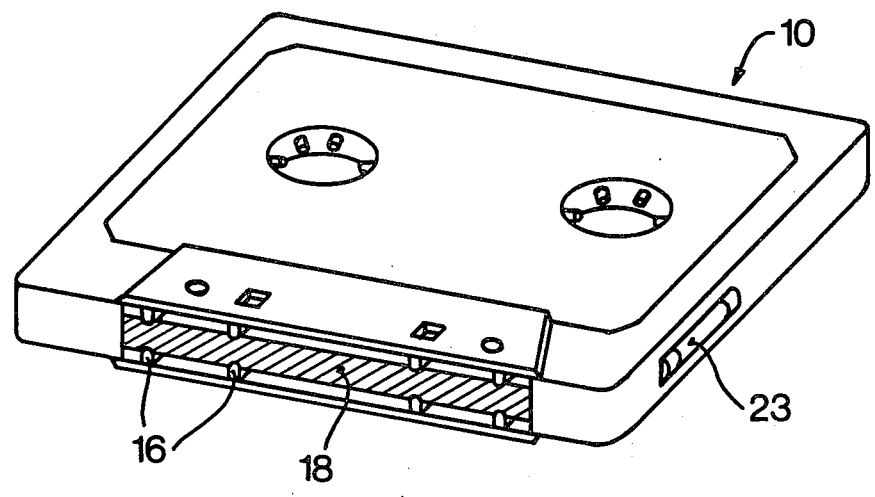
Figure 2A:
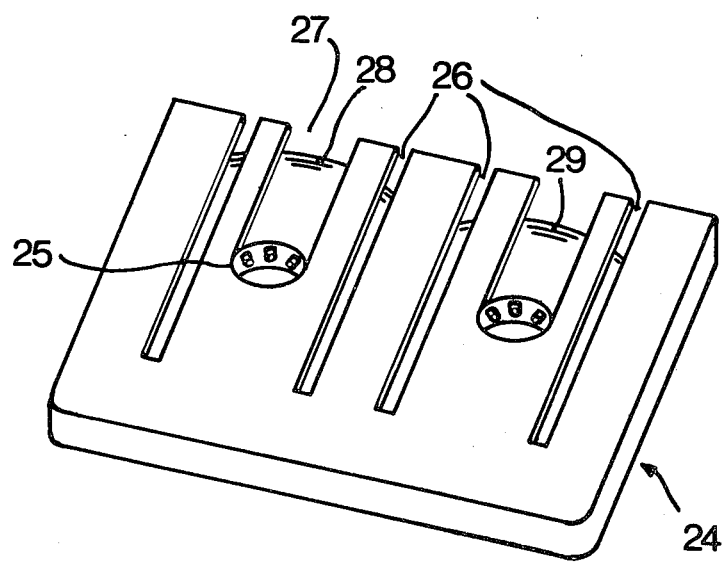
Figure 2B:
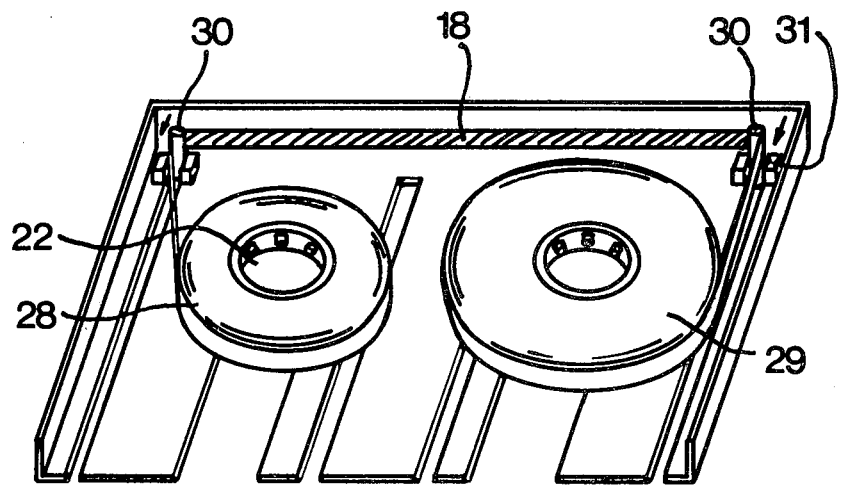
Figure 2C:
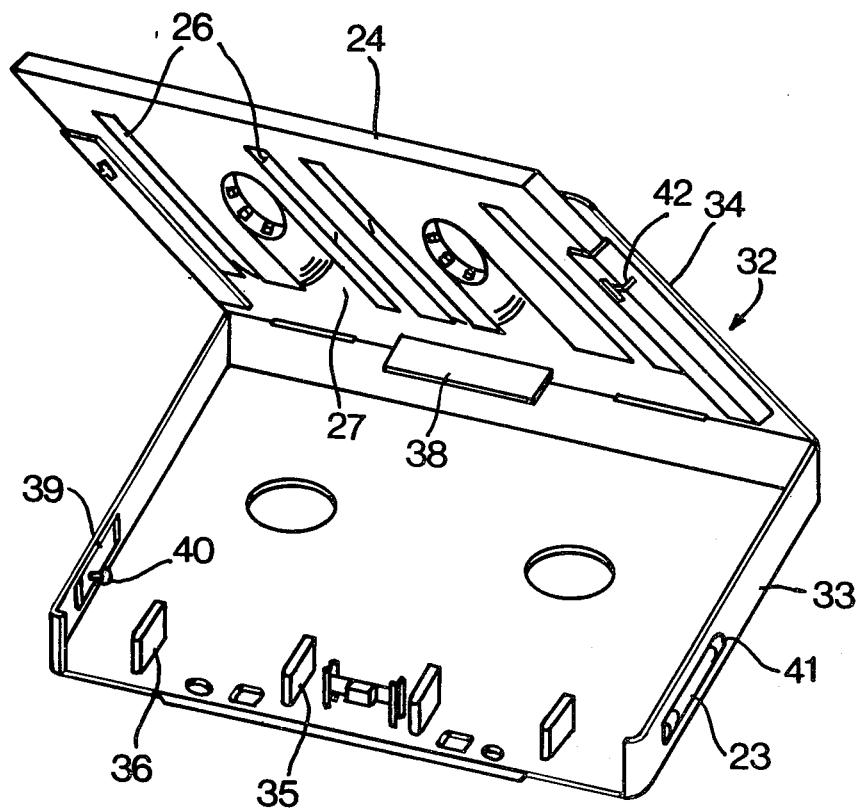
Figure 3C:
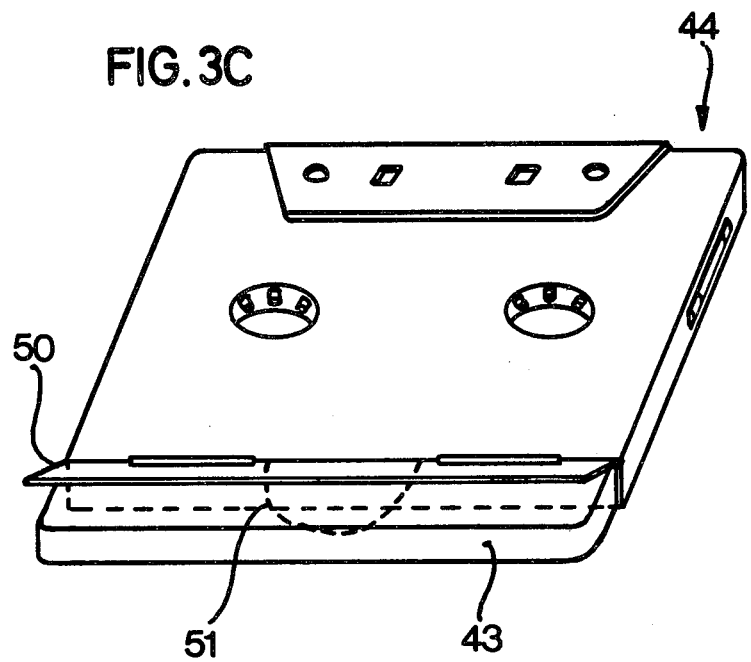
Figure 4:
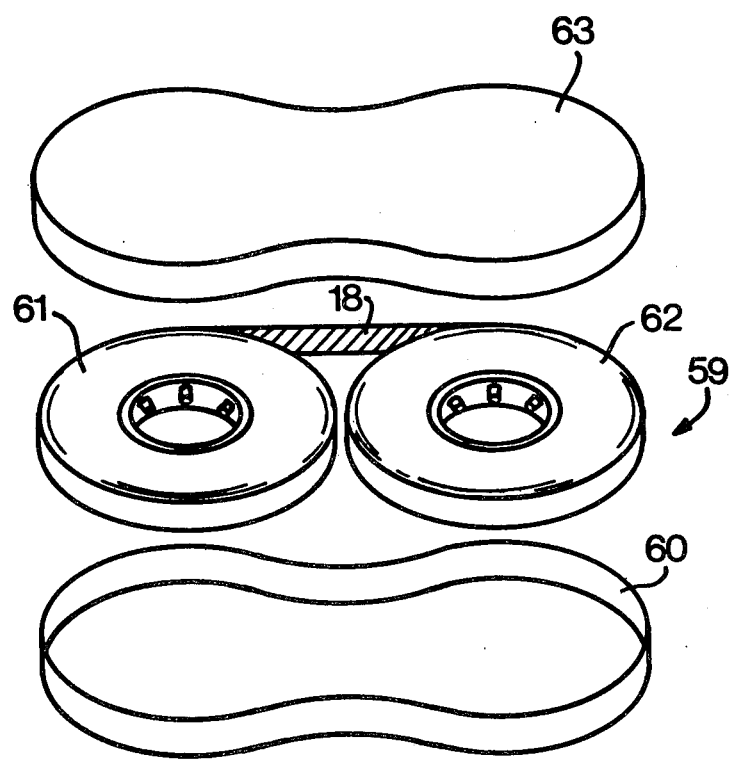

Embodiments of tape cassettes according to the invention are described below with reference to the accompanying drawings, in which FIG. 1A is a view that shows a first protective holder for two reels, FIG. 1B is a view that shows the protective holder according to FIG. 1A, partially inserted into a housing having the external shape of a compact cassette, FIG. 1C is a perspective view of the closed housing containing the protective holder of FIG. 1A, FIG. 2A shows a second protective holder for two reels, FIG. 2B is a further view of the protective holder according to FIG. 2A, with the lid removed, FIG. 2C is a view that shows the protective holder according to FIG. 2A, partially inserted into a housing of a tape cassette, FIG. 3A is a view that shows a third protective holder for two reels, FIG. 3a is a view that shows a section through a corner of the holder of FIG. 3A, FIG. 3B is a view that shows the protective holder of FIG. 3A, inserted into a partially opened housing, FIG. 3b is a view that shows a detail, namely the vertical hinge of FIG. 3B, FIG. 3C is a view that shows the closed housing of FIG. 3B, with the protective holder inserted, viewed from the back, and FIG. 4 is a view that shows an opened box serving as a protective holder, and a pair of reels therefor.

FIG. 1C is a perspective view of a cassette which has standardized dimensions and is intended to have the same functions as a conventional compact cassette.

However, in contrast to conventional compact cassettes, the housing 10 is a precision-made part which is designed to receive a protective holder 11 (hereinafter referred to simply as "holder") (FIG. 1B) with two reels.

The housing 10 (FIGS. 1C and 1B) is preferably made from a material which lends itself to mass-production and retains its shape over a wide temperature range. The housing 10 consists of two parts, the bottom 12 and the lid 13, which in the present case are movably connected by hinges 14. The hinges 14 are fixed to the rear wall of the bottom 12 and to the rim of the flat lid 13. An embodiment of the holder 11 is shown partially inserted into the guide rails 15 on the underside of the lid. After the holder 11 has been inserted and the lid 13 has been closed, tape guide rolls or projections 16 enter the recesses 17 in the holder 11, over which rolls or recesses the tape 18 is tensioned by means of retaining members 19. Pins or rolls 20 are provided on the holder 11 or 11A, at the outer ends of the left-hand and right-hand recesses 17. Advantageously, the interior of the holder 11A is sealed off from the outside at these points, as shown in FIG. 1A, so as to provide protection against dust and dirt.

The size and shape of the holder 11, presently being discussed, is determined by, for example, the maximum reel diameter if the holder, when used in conjunction with the housing 10, is to remain within the latter. In this case, the holder 11 may be made from a suitable material in one piece or from two firmly connected parts.

However, if, after insertion in the housing 10, the holder 11 is to be partially or completely removed therefrom, for example to ensure, from the very beginning, that it does not have an adverse effect on tape guidance, the size of the holder may also be determined by the diameter of a half-full reel. In this case, at least half of the holder is removable, and the two halves of the can be designed to fit together like a box. The holderr 11A in FIG. 1A can be provided with a book-like spine 21, which may for example be detachable and which has a length corresponding to the length of the holder, so that the latter can be stood upright. The spine can be designed to be written upon, for filing purposes.

In a particular embodiment, the holder 11 or 11A consists of two parts which may be symmetrical or unsymmetrical with respect to the median plane of the holder, though a symmetrical shape greatly facilitates mass production. The holder 11 or 11A is advantageously made of a plastics material, for example from a sheet of polystyrene, polyethylene or, preferably, rigid polyvinyl chloride, the sheet material being optionally bonded to paper or cardboard, and the parts of the holder being joined together in a suitable manner, for example by welding. The retaining members 19 and/or guide pins or axles for guide rolls 20 can be suitably attached to one or both parts of the holder, for example by driving them into the material. The retaining members 19, guide pins and rolls 20 should consist of a nonmagnectic material which has little tendency to build up static charge. During recording and playback, the holder 11, 11A is inside the housing 10, and one or more magnetic heads are pressed against the unsupported spans of tape over the recesses 17, the compressive force determining the wraparound angle on the head. The reels, which are within the holder 11 or partially or completely detached from the holder 11, are driven by winding spindles on the transport apparatus which enter the openings 22 in the hubs.

In FIGS. 1B and 1C, actuating means 23 for a locking device for the bottom 12 and lid 13 are shown on a sidewall of the housing. The locking device is shown more clearly in FIG. 2C and will be described in more detail later.

FIGS. 2A to 2C show a further embodiment of a holder 24 intended to be mass-produced economically, for example by thermoforming, from the materials mentioned earlier, and to protect the rolls of tape against dust and mechanical damage. The holder 24 is provided with transvern slot 26 and 27; the latter having arcuate ends 25 which cooperate with the hubs and thus fix the reels in the horizontal plane. Slots 26 and 27 can cooperate with guide members in the housing 32 when the holder is inserted and removed. It is also possible to dispense with slots 27, in which case, for example, inwardly pointing projections which engage the central openings in the hubs assume the role played by the arcuate ends 25.

When the tape is fitted in the holder 24, the reels 28 and 29 are inserted into the open side of the holder 24 until the reel hubs are fixed, and centered, by the arcuate ends 25. The tape 18 can then be placed over tape tensioning pins or rolls 30 which are so designed that they can be pivoted from the vertical position shown, into a horizontal position or, better still, can be swung downwards against the action of a spring. The pivot bearings are shown, in FIG. 2B, as blocks 31 for a pivot which is not shown. After the tape 18 has been placed over the tape-tensioning pins 30, the lower part of the holder, shown in FIG. 2B, can be made up into a complete holder by placing an upper part on top of it, or by attaching an upper part thereto in a suitable manner, and is then ready for insertion into a housing. FIG. 2C shows a housing 32 which has been modified to receive the holder 24 and is slightly different from the housing 10 shown in FIG. 1B.

The housing 32 can be produced from a suitable heat-resistant material of high mechanical strength, for example from a metal, a metal alloy, a plastic, which may or may not be glass fiber-reinforced, or a combination of plastic and metal parts. Advantageously, the housing 32 consists of two parts 33 and 34 which, like the parts 12 and 13 of the housing 10, are connected to one another by horizontal hinges, so that the lid 34 can be pivoted into a vertical plane. In contrast to the housing 10, elongated tape guide members 35 and 36 are provided, whose length depends on the maximum size of the reels and whose height is determined by the inner height of the housing 32. FIG. 2C shows the holder 24, in a not yet fully inserted position, in guide rails 37 on the lid 34. When the holder has been pushed in up to the stop 38 and the lid 34 has been closed, guide members 35 and 36 engage the slots 26 in the holder 24 and thus cause the latter to be very accurately aligned in the housing 32. As the guide members 36 enter the outer slots 26, they actuate the tape-tensioning pins 30, so that these pivot in the direction shown by the arrows in FIG. 2B. The holder 24 can be withdrawn from the housing 32 either by means of a projection on the holder, not shown here (but shown in FIG. 3C) or by means of the part of the holder which protrudes beyond the plan-view contour of the housing 32 (cf. FIG. 3C).

To enable the holder 24 to be withdrawn at the front of the housing 32, the front wall has a longer opening than that of the housing 10.

It should be noted, at this juncture, that, in contrast to the embodiment shown in FIGS. 1A to 1C, the holder 24 is introduced into the guide rails 37 with its open longitudinal side first, so that it can be readily withdrawn from the front of the housing 32. As a result of the design of the present embodiment, when the housing is closed the magnetic tape 18 readily passes over the tape guide means, in the present case elongated members 35 and 36; it is of course also possible to use rolls as guide means. The pivotable tensioning pins 30 must therefore be appropriately arranged in the holder. When the pins 30 have been swung downwards, the tape 18 is released from the holder 24 and becomes, if appropriate temporarily, part of the housing 32, by means of which the tape can be guided very accurately on a conventional cassette recorder. After the recording or playback operation is over, it is simple to reinsert the holder 24 into the housing 32, release the tape 18 and the reels 28 and 29, and take the holder with the tape reels out of the housing 32. In the course thereof, the tensioning pins or rolls 30 re-assume their vertical position so that they lift the tape 18 off the tape guide means on the housing 32.

The specific procedure for removing the reels from the housing is as follows:

The holder 24, with the slots 26 and 27 facing the bottom 33, is inserted into the housing 32, with its open longitudinal side first, until the stop 38 is reached. In the course thereof, the reels 28 and 29 slide into the holder 24 and are fixed by engagement of the hubs with the arcuate ends 25. At this point in time, the tape 18 is already in contact with the tensioning pins 30. After operating the locking mechanism, the housing 32 is opened and the holder 24 containing the reels can be taken out, and, if appropriate, filed.

In addition to the arcuate ends 25, other parts of the walls of the holder 24 may be in contact with the reels; for example the large walls of the holder may be domed inwards toward the reels 28 and 29 like the liners in a compact cassette for example. In a practical embodiment, it is of course also possible, in order to protect the tape, to design the slots 26 and 27 as embossed grooves which project inwards and function as ridges which guide the reels. Such embossed grooves 26 then need only have openings in the region of the tensioning pins 30, so that the pins can be pivoted downwards by parts on the housing passing through these openings. In principle, the slots or grooves can also be replaced by parallel ribs on the inner surface of the holder, in which case openings are again necessary.

Locking means of the housing 32 are shown in FIG. 2C. A movable spring member 39 is attached at one end to one or both sidewalls and carries an inwardly projecting stud 40 and an actuating button 23 which passes through a slot 41 in the side wall of the housing, and can be operated from the outside by finger pressure. An opening 42 to receive the stud 40 is provided in one or both guide rails 37.

Depression of the button(s) 23 from the outside moves the spring member(s) 39 inwards, thus enabling the stud(s) 40 to engage the opening(s) 42. Locking is effected by releasing the button(s) 23. Unlocking is effected by depressing the button(s), thus disengaging the stud(s) 40 from the opening(s) 42.

A third embodiment of a holder 43 is shown in FIGS. 3A to 3C and is intended for use in conjunction with a housing 44, whose lid 45 can be pivoted in a horizontal plane abut a vertical hinge 46. Essentially, the holder 43 and housing 44 correspond to those described earlier, with the following differences.

The hinge 46 consists of a pivot 47 and a bushing 48, with an axial locking spring 46 (cf. FIG. 3b). The rear edge of the lid 45 of the housing has a hinged flap 50, which is advantageously pretensioned in the closing direction, and which once again permits the use of a holder 43 which can be withdrawn from the housing. To enable the holder to be withdrawn manually, it either has a suitable projection 51 or is wider than the housing. By pulling on the projection 51 or on the protruding part of the holder, the holder 43 can be withdrawn backwards from the housing 44 and the hinged flap 50 closes automatically. The reels are at this stage ready for operation in the housing 44, the tape 18 being guided, on either side of the tape pressure pad 58, by tape guide members 56 and guide rolls 57. The holder 43 is inserted from above into the bottom 64 of the housing 44, the tape 18 spanning an elongate recess 52 in the holder 43, into which recess the tape guide means on the housing 44 project. Retaining means for the tape 18 are provided in the front corners of the holder 43, so that the tape cannot slip into the interior of the holder 43, which would make insertion into the housing 44 an involved procedure.

The retaining means, here in the form of stubs 53 and 54 attached to the lower and upper part respectively, must be so designed and arranged, in order to permit withdrawal of the holder 43 from the housing, that the tape 18 can slip therebetween. Re-insertion of the reels into the holder 43 is in this case only possible after the housing 44 has been opened, the lower part of the holder has been inserted, and the upper part of the holdr has been placed on top.

The holder 43 is advantageously closed on five sides, and the reels leave the holder 43 through the opening 55, which adjoins the slot 52, when the holder is withdrawn. Advantageously, the holder 43 is designed like a box, so that it can be parted, for example, symmetrically in its median plane.

FIG. 4 shows a further embodiment of a holder 59. This constitutes an example of a box-like holder referred to above. A lower part 60 has a shape corresponding to that of two reels 61 and 62 each carrying about half the total length of tape, so that both reels can easily be clamped between the sidewalls of the lower part 60 and are thus retained in a manner which prevents them from slipping about. Such a holder can be designed to accommodate just one reel, as can the above-described holder embodiments.

The upper part 63 fits exactly over the lower part 60, advantageously giving a tight seal, so that the reels 61 and 62 are stored in a dustproof manner and safe from damage. After removing the upper part 63, the reels 61 and 62, together with the lower part 60, can be inserted into a part of an appropriately designed housing, which part is preferably already on the apparatus, so that the winding spindles pass through the openings in the housing into the housing interior; the central openings in the hubs immediately come into engagement with the winding spindles when the lower part 60 containing the reels is placed in position, and the lower part 60 of the holder 59 can than be pulled off carefully. Before starting the transport apparatus, all there remains to do is to place the span of tape 18, extending between the two reels, over the tape guide means on the apparatus or on the housing, by hand or with an auxiliary tool, such as a pair of tweezers, and to close the housing or the apparatus.

In principle it is also possible to leave one of the parts of the holder in the housing or transport apparatus and only remove the other part. In this case, the part of the holder which remains in the housing or apparatus must possess openings for the admission of guide and drive means. In order to keep out dust when such a holder is closed, the openings must be suitably covered.

The holder 59 can be produced from a suitable plastic as an extremely simple thermoformed article, like a blister-pack container for example.

We claim:

1. A cassette arrangement for a recording medium in strip or tape form, particularly a magnetic tape, for use with a recording and/or playback apparatus having drive means and scanning means, said cassette arrangement comprising two separate components, namely an approximately rectangular outer cassette housing and an inner protective reel-holder, said cassette housing having a bottom part and a lid part, having openings for admitting said drive means and scanning means and, in one of said openings which is located adjacent the front of said housing, guide means for said recording medium, and also having guiding and holding rails in said lid and/or bottom parts for internally receiving, when said housing is open, said reel-holder, and to position said holder with respect to the tape guide means, and said reel-holder being in the form of a substantially closed, flat container the interior of which, circumferentially, is bordered by at least three side walls, and said holder accommodating the hub or hubs on which said recording medium is wound to form said reel or reels, in a location or locations such as to permit, in cooperation with said guiding and holding rails, introduction of said reel(s) into the open cassette housing in the correct position for operation.

2. A cassette arrangement as claimed in claim 1, wherein said reel-holder includes bottom and top parts which are removable from each other, both of said parts being detached from said reel(s) as said reel is (reels are) introduced into said housing.

3. A cassette arrangement as claimed in claim 1, wherein said cassette housing, together with the guide means thereon is formed of a material insuring closer tolerances than the material from which the reel-holder is formed.

4. A cassette arrangement as claimed in claim 1, wherein there are provided connecting means for pivotally connecting said lid and bottom parts together.

5. A cassette arrangement as claimed in claim 4, wherein there are provided connecting means for pivoting said lid about a horizontal axis.

6. A cassette housing as claimed in claim 4, wherein there are provided connecting means for pivoting said lid part about a vertical axis.

7. A cassette arrangement as claimed in claim 4, wherein said guide means for the recording medium are provided on only one of said two parts of the cassette housing.

8. A cassette arrangement as claimed in claim 4, wherein said guide means for the recording medium are provided on both of said two parts of the cassette housing, said guide means, after said two parts have been brought together, conjointly effecting the guidance of the recording medium.

9. A cassette arrangement as claimed in claim 1, wherein guide means for the recording medium are provided exclusively on the cassette housing.

10. A cassette arrangement as claimed in claim 1, wherein tensioning means for the recording medium are provided on the reel-holder to insure that the recording medium is in a predetermined position when said reel-holder is introduced into the cassette housing, and wherein there are provided elements on said housing for pivoting said tensioning means into an out-of-the-way position when said reel-holder has been so introduced.

11. A cassette arrangement as claimed in claim 4, wherein there are provided means for locking said bottom part and said lid part together.

12. A cassette arrangement as claimed in claim 1, wherein the reel-holder is provided with guide slots which cooperate with guide elements provided on the housing.

13. In a cassette arrangement for a recording medium in strip or tape form, particularly a magnetic tape, for use with a recording and/or playback apparatus having drive means and scanning means, said cassette arrangement comprising an inner protective reel-holder in the form of a substantially closed, flat container the interior of which, circumferentially, is bordered by at least three side walls, said holder carrying a hub or hubs on which said recording medium is wound to form said reel or reels thereon, an approximately rectangular outer cassette housing forming a separate part of said cassette arrangement, said housing having a bottom part and a lid part, having openings to admit said drive means and said scanning means and, in one of said openings which is located adjacent the front of said housing, guide means and a pressure pad for said recording medium, and also having guiding and holding rails in said lid and/or said bottom parts to facilitate introduction of said reel(s), by means of said holder, into the open cassette housing in the correct position for operation.

14. In a cassette arrangement a housing as claimed in claim 13, wherein there are provided connecting means for connecting said bottom part and said lid part together, and locking means for releasably locking the connection.

15. In a cassette arrangement housing as claimed in claim 14, wherein said connecting means are releasable.

16. In a cassette arrangement a housing as claimed in claim 14, wherein said connecting means are non-releasable.

17. In a cassette arrangement a housing as claimed in claim 15 or 16, wherein said connecting means are hinge means.

18. In a cassette arrangement a housing as claimed in claim 14, wherein said housing is made from a light metal or light metal alloy.

19. In a cassette arrangement a housing as claimed in claim 14, wherein said housing is made from polystyrene.

* * * * *